United States Patent
Kohiruimaki et al.

(10) Patent No.: US 9,056,931 B2
(45) Date of Patent: Jun. 16, 2015

(54) METHOD FOR PRODUCING OLEFIN POLYMER

(75) Inventors: Jun Kohiruimaki, Ichihara (JP); Masao Aida, Ichihara (JP); Jun Mase, Ichihara (JP); Kana Minamimoto, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 14/124,933

(22) PCT Filed: Jun. 27, 2012

(86) PCT No.: PCT/JP2012/004157
§ 371 (c)(1),
(2), (4) Date: Dec. 9, 2013

(87) PCT Pub. No.: WO2013/008398
PCT Pub. Date: Jan. 17, 2013

(65) Prior Publication Data
US 2014/0114032 A1   Apr. 24, 2014

(30) Foreign Application Priority Data
Jul. 13, 2011   (JP) .................. 2011-154777

(51) Int. Cl.
| | | |
|---|---|---|
| *C08J 3/09* | (2006.01) | |
| *C08F 4/6592* | (2006.01) | |
| *C08F 10/14* | (2006.01) | |
| *C08F 210/14* | (2006.01) | |
| *C08F 2/06* | (2006.01) | |
| *C08F 6/00* | (2006.01) | |
| *C08F 6/02* | (2006.01) | |
| *C08F 4/659* | (2006.01) | |

(52) U.S. Cl.
CPC ............ *C08F 210/14* (2013.01); *C08J 3/09* (2013.01); *C08F 2/06* (2013.01); *C08F 6/003* (2013.01); *C08F 6/02* (2013.01); *C08F 4/65908* (2013.01); *C08F 4/65912* (2013.01); *C08F 4/65927* (2013.01)

(58) Field of Classification Search
CPC .... C08F 4/6592; C08F 10/14; C08F 210/141; C08F 2/06; C08J 3/09
USPC ....................... 526/160, 348.2, 943
See application file for complete search history.

(56) References Cited

U.S. PATENT DOCUMENTS

| 2008/0020928 A1 | 1/2008 | Wu et al. |
| 2013/0296518 A1 | 11/2013 | Sato et al. |

FOREIGN PATENT DOCUMENTS

| EP | 1 754 694 A1 | 2/2007 |
| JP | 41-9036 B1 | 5/1966 |
| JP | 56-53110 A | 5/1981 |
| JP | 2003-96128 A | 4/2003 |
| JP | 2008-231261 A | 10/2008 |
| JP | 2009-504577 A | 2/2009 |
| JP | 2009-543927 A | 12/2009 |

OTHER PUBLICATIONS

U.S. Appl. No. 14/126,090, filed Dec. 13, 2013, Kohiruimaki, et al.
International Search Report issued Oct. 2, 2012 in PCT/JP2012/004157.
Written Opinion issued Oct. 2, 2012 in PCT/JP2012/004157 filed Jun. 27, 2012.
International Preliminary Report on Patentability issued Jan. 23, 2014 in PCT/JP2012/004157 filed Jun. 27, 2012.

*Primary Examiner* — Caxia Lu
(74) *Attorney, Agent, or Firm* — Oblon, McClelland, Maier & Neustadt, L.L.P.

(57) ABSTRACT

A method for producing an olefin polymer including: polymerizing one or more α-olefins each having 6 to 20 carbon atoms in the presence of a metallocene catalyst to obtain an olefin polymer, and diluting a polymerization reaction liquid with a solvent before or simultaneously with deactivation of the catalyst, thereby to lower the liquid viscosity of the polymerization reaction liquid to 10 mPa·s or less to promote deactivation and decalcification of the catalyst.

3 Claims, 2 Drawing Sheets

METHOD FOR PRODUCING OLEFIN POLYMER

TECHNICAL FIELD

The invention relates to a method for producing an olefin polymer and an olefin polymer obtained by this method.

BACKGROUND ART

Usually, in many cases, polymerization reaction of poly-α-olefin using a metallocene catalyst are continuously performed, and the monomer conversion rate is about 30 to 70%. Under such circumstances, a still higher productivity has been desired.

For example, according to Patent Document 1, in the production technology of a conventional olefin-based polymer, the concentration of the olefin-based polymer at the time of the end of a reaction was 2 to 40 mass % in a polymerization reaction solution. In order to prevent an excessive polymerization reaction, an active proton-containing oxygen compound was added.

Moreover, in the production process of poly-α-olefin, in order to prevent excessive polymerization or to prevent deterioration of product quality, it is required to deactivate a catalyst after the end of a polymerization reaction to remove a metal component (decalcification).

For example, as the production method of poly-α-olefin, a method in which a crude product obtained after polymerization is brought into contact with a solid absorbent (alumina, acid clay, celite, or the like), thereby to absorb a catalyst residue, followed by filtration, or a method in which a compound having a hydroxyl group is added, thereby allowing a metal complex catalyst component to be unsoluble and removed is known (Patent Document 2). However, in this method, to remove a solid of several thousand to several hundred wt ppm by centrifugation or filtration, a large-sized centrifuge or a filtration machine is required, resulting in lowering of productivity.

Moreover, if a product was manufactured without the processing, a metal component was contained in the product in an amount of several ten to several hundred wt ppm.

RELATED ART DOCUMENTS

Patent Documents

Patent Document 1: JP-A-2008-231261
Patent Document 2: JP-A-2003-96128

SUMMARY OF THE INVENTION

An object of the invention is to provide a method for producing an olefin polymer which can easily and efficiently suppress mixing of metal components derived from a catalyst in a polymer.

The inventors have found that by increasing the viscosity of a polymer reaction liquid of olefin polymerization, a high monomer conversion rate (90% or more, for example), deactivation or decalcification is prevented by such a high viscosity, and that deactivation or decalcification can be promoted by lowering the viscosity of a polymer reaction liquid. The invention has been made based on this finding.

According to the invention, the following method for producing an olefin polymer or the like is provided.
1. A method for producing an olefin polymer comprising:
   polymerizing one or more α-olefins each having 6 to 20 carbon atoms in the presence of a metallocene catalyst to obtain an olefin polymer, and diluting a polymerization reaction liquid with a solvent before or simultaneously with deactivation of the catalyst, thereby to lower the liquid viscosity of the polymerization reaction liquid to 10 mPa·s or less to promote deactivation and decalcification of the catalyst.
2. The method for producing an olefin polymer according to 1, wherein a solvent with a boiling point which enables the removal of the solvent by distillation in a post process is used as the solvent.
3. The method for producing an olefin polymer according to 1 or 2, wherein an un-reacted monomer or a polymerization reaction solvent removed in a post process is used as the solvent.
4. An olefin polymer obtained by the method for producing an olefin polymer according to any of 1 to 3.

According to the invention, it is possible to provide a method for producing an olefin polymer which can easily and efficiently suppress mixing of metal components derived from a catalyst in a polymer.

BRIEF DESCRIPTION OF THE INVENTION

MODE FOR CARRYING OUT THE INVENTION

In the method for producing an olefin polymer of the invention, in the presence of a metallocene catalyst, one or more (one, two or three, for example) α-olefins having 6 to 20 carbon atoms are polymerized to produce an olefin polymer, followed by deactivation of a catalyst. Before or simultaneously with the deactivation, by diluting a polymerization liquid in a solvent, the liquid viscosity at the time of the deactivation is lowered to 10 mPa·s or less. By reducing the viscosity, deactivation or decalcification of a catalyst can be promoted.

Generally, in order to deactivate a polymerization catalyst, a deactivator (for example, an aqueous NaOH solution) is mixed in a polymerization liquid with stirring. As a result, most catalysts included in a polymerization reaction liquid (usually, oil phase) are extracted into the deactivator (usually, water phase). Then, water-oil separation is conducted taking the polymerization reaction liquid as the oil phase and the deactivator as the water phase, whereby a catalyst is separated from the polymerization reaction liquid.

From the viewpoint of productivity, the conversion rate of a polymerization reaction is 85% or more, more preferably 90% or more. In this case, a polymerization reaction liquid may have a high viscosity such as 20 mPa·s to 500 mPa·s.

If a polymerization reaction liquid having a high viscosity (usually, oil phase) and the deactivator (usually, aqueous phase) are mixed with stirring, the oil phase becomes a continuous phase at a usual mixing ratio. As a result, mixing with stirring and oil-water separation become difficult affected by the viscosity of the oil phase. Further, since the viscosity of the oil phase is high, transfer of substances is restricted, resulting in difficulty in quick deactivation of a catalyst.

In the case where a catalyst is remained in the reaction liquid without being deactivated, the thus remaining catalyst promotes thermal decomposition in a distillation operation in the post process or is remained in a product, and there is a possibility that the performance as lubricating oil of the olefin polymer is deteriorated remarkably.

For the method for lowering the liquid viscosity of the oil phase, by changing operation conditions of a process (temperature, pressure), in particular, by increasing the temperature, in general, the liquid viscosity can be remarkably lowered. However, increasing the temperature before deactivation of a catalyst is not preferable since the polymerization proceeds excessively or the product quality is deteriorated by metal components of the catalyst residue.

According to the invention, by diluting the polymerization liquid with a solvent simultaneously with or before mixing with a deactivator to lower the viscosity of the oil phase, mixing with stirring and substance transfer are promoted to complete the deactivation of a catalyst. That is, in the invention, deactivation or decalcification can be conducted easily even if the monomer conversion rate is increased to increase the viscosity.

The α-olefin having 6 to 20 carbon atoms used in the polymerization is preferably an α-olefin having 6 to 14 carbon atoms, more preferably α-olefin having 8 to 12 carbon atoms. 1-decene, 1-octene and 1-dedecene are further preferable. The polymer of the invention is normally dimer to 200-mer, with tetramer to 200-mer being preferable.

In the polymerization process of the invention, (A) a metallocene compound is used as the polymerization catalyst and, in addition to the metallocene compound, (B) an organic aluminumoxy compound (b-1), an ionic compound which can be converted to a cation by reacting with the above-mentioned methallocene compound (b-2) or (C) an aluminum compound or the like can be used. The metallocene compound or other polymerization catalysts are referred to as the "polymerization catalyst".

As the metallocene compound (A), one represented by the following general formulas (I) to (IV) can be used.

(I)

wherein $M^1$ are independently titanium, zirconium or hafnium, $C^1$ and $C^2$ are independently a cyclopentadienyl group, an indenyl group or an alkyl-substituted body thereof, and $C^1$ and $C^2$ may be the same or different from each other; $X^1$ and $X^2$ are independently σ-binding ligand or a chelate ligand, and $X^1$ and $X^2$ may be the same or different; $Y^1$ and $Y^2$ are independently a Lewis base; $Y^1$ and $Y^2$ may be the same or different; and a and b are independently 0 or 1.

(II)

wherein $M^2$ is titanium, zirconium or hafnium; $C^3$ and $C^4$ are independently a cyclopentadienyl group or an indenyl group or an alkyl-substituted body thereof, and $C^3$ and $C^4$ may be the same or different from each other; $X^3$ and $X^4$ are independently σ-binding ligand or a chelate ligand, and $X^3$ and $X^4$ may be the same or different; $Y^3$ and $Y^4$ are a Lewis base; c and d independently are 0 or 1, and $Y^3$ and $Y^4$ may be the same or different; A is a cross-linking group and indicates —$R_2C$— or —$R_2Si$—, and R are independently a hydrogen atom or a hydrocarbon group.

(III)

wherein $R^1$ to $R^6$ are independently a hydrogen atom, a halogen atom, a hydrocarbon group having 1 to 20, preferably 1 to 10, more preferably 1 to 4 carbon atoms (alkyl group, for example) or an organic group having 1 to 20 carbon atoms which contains one or more atoms selected from a halogen atom, a silicon atom, an oxygen atom, a sulfur atom, a nitrogen atom and a phosphor atom; at least one selected from $R^1$ to $R^3$ is a hydrogen atom, and at least one selected from $R^4$ to $R^6$ is a hydrogen atom; $R^a$ and $R^b$ are independently a bonding group represented by the following formula (a); $X^1$ and $X^2$ are independently a hydrogen atom, a halogen atom, a hydrocarbon group having 1 to 20 carbon atoms or an organic group having 1 to 20 carbon atoms containing one or more atoms selected from, a halogen atom, a silicon atom, an oxygen atom, a sulfur atom, a nitrogen atom and a phosphor atom; and M is a transitional metal belonging to the $4^{th}$ to $6^{th}$ group of the periodic table.

(a)

wherein n is an integer of 1 to 3; $R^7$ and $R^8$ are independently a hydrogen atom, a halogen atom, a hydrocarbon group having 1 to 20 carbon atoms or a halogen-containing hydrocarbon group having 1 to 20 carbon atoms, preferably a hydrogen atom or a hydrocarbon group having 1 to 4 carbon atoms, more preferably a hydrogen atom or an alkyl group having 1 to 4 carbon atoms; and B is an atom belonging to the $14^{th}$ group of the periodic table.

As preferable examples of $R^a$ and $R^b$, —$CR^7R^8$—, —$SiR^7R^8$—, —$CR^7R^8$—$CR^7R^8$—, and —$SiR^7R^8$—$SiR^7R^8$— can be given.

(IV)

wherein $R^9$ to $R^{18}$ and $X^1$ and $X^2$ are independently a hydrogen atom, a halogen atom, a hydrocarbon group having 1 to 20, preferably 1 to 10, more preferably 1 to 4 carbon atoms (alkyl group, for example), a halogen-containing hydrocarbon group having 1 to 20 carbon atoms, a silicon-containing group, an oxygen-containing group, a sulfur-containing group, a nitrogen-containing group or a phosphor-containing group, and they may combine with adjacent groups to form a ring; $R^c$ and $R^d$ are independently a divalent group having two ligands and indicate a divalent hydrocarbon group having 1 to 20, preferably 1 to 10, more preferably 1 to 4 carbon atoms, a halogen-containing hydrocarbon group having 1 to 20 carbon atoms, a divalent silicon-containing group, a divalent germanium-containing group, a divalent tin-containing group, —O—, —CO—, —S—, —SO$_2$—, —NR$^{19}$—, —PR$^{19}$—, —P(O)R$^{19}$—, BR$^{19}$— or —AlR$^{19}$—; $R^{19}$ is a hydrogen atom, a halogen atoms, a hydrocarbon group having 1 to 20 carbon atoms or a halogen-containing hydrocarbon group having 1 to 20 carbon atoms; and M is a transitional metal belonging to the 4$^{th}$ to 6$^{th}$ group of the periodic table.

Specific examples of the metallocene compound represented by the formula (I) include bis(cyclopentadienyl)zirconium dichloride, bis(methylcyclopentadienyl)zirconium dichloride, bis(ethylcyclopentadienyl)zirconium dichloride, bis(isopropylcyclopentadienyl)zirconium dichloride, bis(n-propylcyclopentadienyl)zirconium dichloride, bis(n-butylcyclopentadienyl)zirconium dichloride, bis(t-butylcyclopentadienyl)zirconium dichloride, bis(hexylcyclopentadienyl)zirconium dichloride, bis(trimethylsilylcyclopentadienyl)zirconium dichloride, bis(trimethylsilylmethylcyclopentadienyl)zirconium dichloride, bis(cyclopentadienyl)zirconium chlorohydride, bis(cyclopentadienyl)methylzirconium chloride, bis(cyclopentadienyl)ethylzirconium chloride, bis(cyclopentadienyl)methoxyzirconium chloride, bis(cyclopentadienyl)phenylzirconium chloride, bis(cyclopentadienyl)dimethylzirconium, bis(cyclopentadienyl)diphenylzirconium, bis(cyclopentadienyl)dineopentylzirconium, bis(cyclopentadienyl)dihydrozirconium and bis(cyclopentadienyl)dimethoxyzirconium. Further, those obtained by replacing the chlorine atom in the above-mentioned compounds by a bromine atom, an iodine atom, a hydrogen atom, a methyl group, a phenyl group or the like can be given. In addition, those obtained by replacing zirconium as the central metal in the above-mentioned compounds by titanium or hafnium can be given.

Specific examples of the metallocene compounds represented by the general formula (II) include ethylene-bis(cyclopentadienyl)hafnium dichloride, ethylene-bis(cyclopentadienyl)zirconium dichloride, methylene-bis(cyclopentadienyl)hafnium dichloride, methylene-bis(cyclopentadienyl)zirconium dichloride, isopropylidene-bis(cyclopentadienyl)hafnium dichloride, isopropylidene-bis(cyclopentadienyl)zirconium dichloride, dimethylsilylene-bis(cyclopentadienyl)hafnium dichloride and dimethylsilylene-bis(cyclopentadienyl)zirconium dichloride.

Specific examples of the metallocene compound represented by the general formula (III) include a dichloro compounds such as (1,1'-ethylene)(2,2'-ethylene)biscyclopentadienylzirconium dichloride, (1,1'-ethylene)(2,2'-ethylene)bis(3-methylcyclopentadienyl)zirconium dichloride, (1,1'-ethylene)(2,2'-ethylene)bis(4-methylcyclopentadienyl)zirconium dichloride, (1,1-ethylene)(2,2'-ethylene)bis(3,4-dimethylcyclopentadienyl)zirconium dichloride, (1,1'-ethylene)(2,2'-ethylene)bis(3,5-dimethylcyclopentadienyl)zirconium dichloride, (1,1'-dimethylsilylene)(2,2'-dimethylsilylene)biscyclopentadienylzirconium dichloride, (1,1'-dimethylsilylene)(2,2'-dimethylsilylene)bis(3-methylcyclopentadienyl)zirconium dichloride, (1,1'-dimethylsilylene)(2,2'-dimethylsilylene)bis(4-methylcyclopentadienyl)zirconium dichloride, (1,1'-dimethylsilylene)(2,2'-dimethylsilylene)bis(3,4-dinnethylcyclopentadienyl)zirconium dichloride, (1,1'-dimethylsilylene)bis(3,5-dimethylcyclopentadienyl)zirconium dichloride, (1,1'-dimethylsilylene)(2,2'-ethylene)biscyclopentadienylzirconium dichloride, (1,1'-dimethylsilylene)(2,2'-ethylene)bis(3-methylcyclopentadienyl)zirconium dichloride, (1,1'-dimethylsilylene)(2,2'-ethylene)bis(4-methylcyclopentadienyl)zirconium dichloride, (1,1'-dimethylsilylene)(2,2'-ethylene)bis(3,4-dimethylcyclopentadienyl)zirconium dichloride, (1,1'-dimethylsilylene)(2,2'-ethylene)bis(3,5-dimethylcyclopentadienyl)zirconium dichloride, (1,1'-isopropylidene)(2,2'-dimethylsilylene)biscyclopentadienylzirconium dichloride, (1,1-isopropylidene)(2,2'-dimethylsilylene)bis(3-methylcyclopentadienyl)zirconium dichloride, (1,1-isopropylidene)(2,2'-dimethylsilylene)bis(4-methylcyclopentadienyl)zirconium dichloride, (1,1'-isopropylidene)(2,2'-dimethylsilylene)bis(3,4-dimethylcyclopentadienyl)zirconium chloride, (1,1'-isopropylidene)(2,2'-dimethylsilylene)bis(3,5-dimethylcyclopentadienyl)zirconium dichloride, (1,1'-isopropylidene)(2,2'-isopropylidene)bis(3-methylcyclopentadienyl)zirconium dichloride, (1,1'-isopropylidene)(2,2'-isopropylidene)bis(4-methylcyclopentadienyl)zirconium dichloride, (1,1'-isopropylidene)(2,2'-isopropylidene)bis(3,4-dimethylcyclopentadienyl)zirconium dichloride, and (1,1'-isopropylidene)(2,2'-isopropylidene)bis(3,5-dimethylcyclopentadienyl)zirconium dichloride, and a dimethyl compound, a diethyl compound, a dihydro compound, a diphenyl compound and a dibenzyl compound thereof, as well as a titanium complex and a hafnium complex thereof.

As the compound represented by the general formula (IV), a dichloro compound such as (1,1'-ethylene)(2,2'-ethylene)bisindenylzirconium dichloride, (1,1'-ethylene)(2,2'-ethylene)bis(3-methylindenyl)zirconium dichloride, (1,1'-ethylene)(2,2'-ethylene)bis(4-methylindenyl)zirconium dichloride, (1,1'-ethylene)(2,2'-ethylene)bis(5-methylindenyl)zirconium dichloride, (1,1'-ethylene)(2,2'-ethylene)bis(5,6-benzoindenyl)zirconium dichloride, (1,1'-ethylene)(2,2'-ethylene)bis(4,5-benzoindenyl)zirconium dichloride, (1,1'-ethylene)(2,2'-ethylene)bis(5,6-dimethylindenyl)zirconium dichloride, (1,1'-dimethylsilylene)(2,2'-dimethylsilylene)bisindenylzirconium dichloride, (1,1'-dimethylsilylene)(2,2'-dimethylsilylene)bis(3-methylindenyl)zirconium dichloride, (1,1'-dimethylsilylene)(2,2'-dimethylsilylene)bis(4-methylindenyl)zirconium dichloride, (1,1'-dimethylsilylene)(2,2'-dimethylsilylene)bis(5-methylindenyl)zirconium dichloride, (1,1'-dimethylsilylene)(2,2'-dimethylsilylene)bis(5,6-benzoindenyl)zirconium dichloride, (1,1'-dimethylsilylene)(2,2'-dimethylsilylene)bis(4,5-benzoindenyl)zirconium dichloride, (1,1'-dimethylsilylene)(2,2'-dimethylsilylene)bis(5,6-dimethylindenyl)zirconium dichloride, (1,1'-dimethylsilylene)(2,2'-ethylene)bisindenylzirconium dichloride, (1,1'-dimethylsilylene)(2,2'-ethylene)bis(3-methylindenyl)zirconium dichloride, (1,1'-dimethylsilylene)(2,2'-ethylene)bis(4-methylindenyl)zirconium dichloride, (1,1'-dimethylsilylene)(2,2'-ethylene)bis(5-methylindenyl)zirconium dichloride, (1,1'-dimethylsilylene)(2,2'-ethylene)bis(5,6-benzoindenyl)zirconium dichloride, (1,1'-dimethylsilylene)(2,2'-ethylene)bis(4,5-benzoindenyl)zirconium dichloride, (1,1'-dimethylsilylene)(2,2'-ethylene)bis(5,6-dimethylindenyl)zirconium dichloride, (1,1'-ethylene)(2,2'-dimethylsilylene)bisindenylzirconium dichloride, (1,1'-ethylene)(2,2'-dimethylsilylene)bis(3-methylindenyl) zirconium dichloride, (1,1'-ethylene)(2,2'-dimethylsilylene) bis(4-methylindenyl)zirconium dichloride, (1,1'-ethylene)(2, 2'-dimethylsilylene)bis(5-methylindenyl)zirconium dichloride, (1,1'-ethylene)(2,2'-dimethylsilylene)bis(5,6-benzoindenyl)zirconium chloride, (1,1'-ethylene)(2,2'-dimethylsilylene)bis(4,5-benzoindenyl)zirconium dichloride, (1,1'-ethylene)(2,2'-dimethylsilylene)bis(5,6-dimethylindenyl)zirconium dichloride, (1,1'-dimethylsilylene)(2,2'-isopropylidene)bisindenylzirconium dichloride, (1,1'-dimethylsilylene)(2,2'-isopropylidene)bis(3-methylindenyl) zirconium dichloride, (1,1'-dimethylsilylene)(2,2'-isopropylidene)bis(4-methylindenyl)zirconium dichloride, (1,1'-dimethylsilylene)(2,2'-isopropylidene)bis(5-methylindenyl)zirconium dichloride, (1,1'-dimethylsilylene)(2,2'-isopropylidene)bis(5,6-benzoindenyl)zirconium dichloride, (1,1'-dimethylsilylene)(2,2'-isopropylidene)bis(4,5-benzoindenyl)zirconium dichloride, and (1,1'-dimethylsilylene) (2,2'-isopropylidene)bis(5,6-dimethylindenyl)zirconium dichloride, and a dimethyl compound, a diethyl compound, a dihydro compound, a diphenyl compound, a dibenzyl compound thereof, as well as a titanium complex and a hafnium complex thereof can be given, for example.

The metallocene compound used as the component (A) may be used singly or in combination of two or more.

As the organic aluminiumoxy compound (b-1), a chain-like aluminoxane represented by the following general formula (V) and a cyclic aluminoxane represented by the following general formula (VI) can be given.

In the general formulas (V) and (VI), $R^{20}$ to $R^{25}$ are independently a hydrocarbon group having 1 to 20, preferably 1 to 12 carbon atoms or a halogen atom. As the hydrocarbon group, an alkyl group, an alkenyl group, an aryl group, an arylalkyl group or the like can be given. n indicates a polymerization degree, and is normally an integer of 2 to 50, preferably 2 to 40. $R^{20}$ to $R^{25}$ may be the same or different.

Specific examples of the aluminoxane include methylaluminoxane, ethylaluminoxane and isobutylaluminoxane.

As the method for producing the aluminoxane, a method in which alkyl aluminum is brought into contact with a condensation agent such as water can be given. No specific restrictions are made on this technique, and the reaction may be conducted by a known method. For example, a method in which an organic aluminum compound is dissolved in an organic solvent, and the solution is then brought into contact with water; a method in which an organic aluminum compound is added initially at the time of polymerization, followed by addition of water; a method in which crystallization water contained in metal salts or the like or water adsorbed to an inorganic substance or an organic substance is reacted with an organic aluminum compound; a method in which tetraalkyldialkyldialuminoxane is reacted with trialkylaluminium, followed by reaction with water or the like can be given. The aluminoxane may be one which is insoluble in toluene. These alumioxanes may be used singly or in combination of two or more.

As the component (b-2), any can be used as long as it is an inorganic compound which is reacted with the metallocene compound as the component (A) to convert it into a cation. As the (b-2) component, one represented by the following general formulas (VII) and (VIII) can be preferably used.

In the formula (VII), $L^1$ is a Lews acid base, $R^{26}$ is a hydrogen atom, an alkyl group having 1 to 20 carbon atoms or a hydrocarbon group having 6 to 20 carbon atoms selected from an aryl group, an alklyaryl group and an arylalkyl group.

Specific examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N, N-dimethylaniline; phosphines such as tiethylphosphine, triphenylphosphine and diphenylphosphine; thioethers such as tetrahydrothiophene; esters such as ethyl benzoate and nitriles such as acetonitrile and benzonitrile. Specific examples of $R^{26}$ include a hydrogen atom, a methyl group, an ethyl group, a benzyl group and a trityl group.

In the general formula (VIII), $L^2$ is $M^1$, $R^{27}R^{28}M^2$, $R^{29}C$ or $R^{30}M^2$. $R^{27}$ and $R^{28}$ are independently a cyclopentadienyl group, a substituted cyclopentadienyl group, an indenyl group or a fluorenyl group. $R^{29}$ is an alkyl group having 1 to 20 carbon atoms or a hydrocarbon group having 6 to 20 carbon atoms selected from an aryl group, an alkylaryl group and an arylalkyl group. $R^{30}$ is a macrocyclic ligand such as tetraphenylporphine and phthalocyanine.

$M^1$ contains an element belonging to the $1^{st}$ to $3^{rd}$, $11^{th}$ to $13^{th}$ and $17^{th}$ group of the periodic table, and $M^2$ is an element belonging to the $7^{th}$ to $12^{th}$ group of the periodic table.

Here, specific examples of $R^{27}$ and $R^{28}$ include a cyclopentadienyl group, a methylcyclopentadienyl group, an ethylcyclopentadienyl group and a pentamethylcyclopentadienyl group. Specific examples of $R^{29}$ include a phenyl group, a p-tolyl group and a p-methoxy phenyl. Specific examples of $R^{30}$ include tetraphenylporphorin and phthalocyanine. Specific examples of $M^1$ include Li, Na, K, Ag, Cu, Br, I and $I_3$. Specific examples of $M^2$ include Mn, Fe, Co, Ni and Zn.

In the general formulas (VII) and (VIII), k is an integer of 1 to 3 and an ionic valency of $[L^1-R^{26}]$ or $[L^2]$, a is an integer of 1 or more and $b=(k \times a)$.

$[Z]^-$ is $[Z^1]^-$ or $[Z^2]^-$, which is a non-coordinating anion.

$[Z^1]^-$ is an anion in which a plurality of groups are bonded to an element, that is $[M^3 G^1 G^2 \ldots G^f]^-$. Here, $M^3$ is an element belonging to the $5^{th}$ to $15^{th}$ group of the periodic table, preferably an element belonging to the $13^{th}$ to $15^{th}$ group of the periodic table. $G^1$ to $G^f$ are independently a hydrogen atom, a halogen atom, and a alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group having 1 to 20 carbon atoms or a hetero atom-containing hydrocarbon group having 2 to 20 carbon atoms. Two or more of $G^1$ to $G^f$ may form a ring. f is an integer of [(atomic valence of the central metal $M^3$)+1].

[Z²]⁻ is Brønsted acid of which the logarithm (pKa) of the reciprocal of an acid dissociation constant is −10 or less, a conjugated base of Brønsted acid and Lewis acid, or a conjugate base of an acid which is generally defined as super strong acid. Further, a Lewis acid base may be coordinated.

Here, in [Z¹]⁻, i.e. [M³G¹G² ... Gᶠ]⁻, specific examples of M³ include B, Al, Si, P, As and Sb, with B and Al being preferably given. Specific examples of G¹ and G² to Gᶠ include, as the alkylamino group, a dimethylamino group and a diethylamino group; as the alkoxy group or the aryloxy group, a methoxy group, an ethoxy group, an n-propoxy group and a phenoxy group; as the hydrocarbon group, a methyl group, an ethyl group, n-propyl group, an isopropyl group, an n-butyl group, an isobutyl group, an n-octyl group, an n-eicosy group, a phenyl group, a p-tolyl group, a benzyl group, a 4-t-butyl phenyl group, a 3,5-dimethylphenyl group; as the halogen atom, fluorine, chlorine, bromine and iodine; as the hetero atom-containing hydrocarbon group, a p-fluorophenyl group, a 3,5-difluorophenyl group, a pentachlorophenyl group, a 3,4,5-trifluorophenyl group, a pentafluorophenyl group, 3,5-bis(trifluoromethyl)phenyl group, a bis(trimethylsilyl)methyl group; and as the organic metalloid group, a pentamethyl antimony group, a trimethylsilyl group, a trimethylgermyl group, a diphenylarsine group, a dicyclohexylantimony group and a diphenylboronic group.

As specific examples of the non-coordinating anion, i.e. [Z²]⁻, which is Brønsted acid of which the pKa is −10 or less or a conjugated base of Brønsted acid and Lewis acid, a trifluoromethanesulfonic acid anion($CF_3SO_3$)⁻, a bis(trifluoromethanesulfonyl)methyl anion, a bis(trifluoromethanesulfonyl)benzyl anion, bis(trifluoromethanesulfonyl)amide, a perchloric acid anion($ClO_4$)⁻, a trifluoroacetate anion ($CF_3COO$)⁻, a hexafluoroantimony anion($SbF_6$)⁻, a fluorosulfonic acid anion($FSO_3$)⁻, a chlorosulfonic acid anion ($ClSO_3$)⁻, a fluorosulfonic acid anion/antimony pentafluoride ($FSO_3/SbF_5$)⁻, a fluorosulfonic acid anion/arsenic pentafluoride ($FSO_3/AsF_5$)—, trifluoromethanesulfonic acid/antimony pentafluoride ($CF_3SO_3/(SbF_5)$) can be given.

Specific examples of the component (b-2) include triethylammonium tetraphenylborate, tri-n-butylammonium tetraphenylborate, trimethylammonium tetraphenylborate, tetraethylammonium tetraphenylborate, (tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetrakis-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenyl ammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridium tetrakis(pentafluorophenyl)borate, benzylpyridinium tetrakis(pentafluorophenyl)borate, methyl(2-cyanopyridinium)tetrakis(pentafluorophenyl)borate, benzyl(2-cyanopyridinium)tetrakis(pentafluorophenyl)borate, methyl(4-cyanopyridinium)tetrakis(pentafluorophenyl)borate, triphenyiphosphonium tetrakis(pentafluorophenyl)borate, dimethylanilinium tetrakis[bis(3,5-ditriluforomethyl)phenyl]borate, ferrocenium tetraphenylborate, silver tetraphenylborate, trity tetraphenylborate, manganese tetraphenylporphine tetraphenylborate, ferrocenium tetrakis(pentafluorophenyl)borate, (1,1'-dimethylferrocenium)tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetrakis(pentafluorophenyl)borate, silver tetrafluoroborate, silver hexfluorophosphate, silver hexfluoroarsenate, silver perchlorate, silver trifluoroacetate and silver trifluoromethanesulfonate.

This component (b-2) may be used singly or in combination of two or more. In the invention, if the component (B) is used, the amount ratio of the component (A) to the component (B) is as follows. That is, when the component (b-1) is used as the component (B), the amount ratio of the component (A) to the component (B) is 1:1 to 1:1,000,000, more preferably 1:10 to 1:10,000 in molar ratio. When the component (b-2) is used, the amount ratio of the component (A) to the component (B) is 10:1 to 1:100, more preferably 2:1 to 1:10. As the component (B), the component (b-1) and the component (b-2) or the like may be used singly or in combination of two or more.

The catalyst to be used in the invention may be one that contains the component (A) and the component (B) as the main components, or may be one that contains the component (A), the component (B) and the component (C) as the main components. Here, as the organic aluminum compound as the component (C), a compound represented by the general formula (IX) can be used.

$$(R^{31})_v AlQ_{3-v} \tag{IX}$$

wherein $R^{31}$ an alkyl group having 1 to 10 carbon atoms; Q is a hydrogen atom, an alkoxy group having 1 to 20 carbon atoms, an aryl group having 6 to 20 carbon atoms, or a halogen atom, and v is an integer of 1 to 3.

As specific examples of the compound represented by the general formula (IX), trimethylaluminum, triethylaluminum, triisopropylaluminum, triisobutylaluminum, dimethylaluminum chloride, diethylaluminum chloride, methylaluminumdichloride, ethylaluminum dichloride, dimethylaluminum fluoride, diisobutylaluminum hydride, diethylaluminum hydride, ethylaluminum sesquichloride or the like can be given. These organic aluminum compounds may be used singly or in combination of two or more. The amount mole ratio of the component (A) to the component (C) are preferably 1:1 to 1:10,000, more preferably, 1:5 to 1:2,000, and further preferably 1:10 to 1:1,000. By using the component (C), it is possible to improve activity per transitional metal. However, a too large amount of the organic aluminum compound is not preferable, since it is used wastefully, and it remains in a large amount in an α-olefin polymer.

In the invention, no specific restrictions are imposed on the polymerization method, and any of the block polymerization method, the solution polymerization method, the suspension polymerization method, the slurry polymerization method and the vapor phase polymerization method can be used.

As for the polymerization conditions, the polymerization temperature is normally 0 to 200° C., preferably 30 to 150° C., and more preferably 40 to 120° C. As for the amount ratio of the catalyst relative to the raw material monomer, the raw material monomer/the component (A) (molar ratio) is preferably 1 to $10^8$, and particularly preferably 100 to $10^5$. Further, the polymerization time is normally 5 minutes to 20 hours, reaction pressure is preferably normal pressure to 0.2 MPaG, and particularly preferably from normal pressure to 0.1 MPaG.

In respect of cost effectiveness, it is preferred that polymerization be conducted in the absence of a solvent. However, it is possible to use a solvent. In this case, for example, an aromatic hydrocarbon such as benzene, toluene, xylene and ethyl benzene; a cycloaliphatic hydrocarbon, such as cyclopentane, cyclohexane and methyl cyclohexane; an aliphatic hydrocarbon such as such as pentane, hexane, heptane and octane; and halogenated hydrocarbon chloroform and dichloromethane. These solvents may be used singly or in combination or two or more. Further, a monomer such as 1-decene can be used as a solvent.

After the polymerization, in order to prevent excessive polymerization, a deactivator (catalyst deactivator) is added, thereby to deactivate the polymerization catalyst.

A dilution solvent may be added before the addition of a deactivator or together with the addition of a deactivator.

If dilution is conducted before deactivation of the polymerization catalyst, it is desired that, after dilution, deactivation of a catalyst be conducted as soon as possible. If a long period of time is taken from dilution to deactivation, a polymerization product may be adversely affected.

On the other hand, if a dilution solvent is added before or during the polymerization reaction, the monomer concentration in the polymerization apparatus is lowered to decrease the polymerization reaction speed, resulting in a lowering of productivity.

In the invention, since the polymerization reaction liquid is diluted in a solvent to lower the viscosity of the oil phase, it is possible to decrease the size of a stirring chamber, a settled separation chamber for oil-water separation and a filter for removing fine particles, thus leading to a reduction in cost.

The above-mentioned dilution is conducted such that the liquid viscosity of the polymerization liquid at the time of deactivation becomes 10 mPa·s or less, preferably 5 mPa·s or less. The liquid viscosity can be measured by the method described in Examples.

The liquid viscosity of the polymerization reaction liquid at the time of the deactivation is the same as that of the polymerization reaction solution after the dilution.

If liquid-liquid separation is conducted when mixed with a deactivator, as for the liquid viscosity of the polymerization reaction liquid, the liquid viscosity of the oil phase is normally measured.

If the liquid viscosity of the polymerization reaction liquid after dilution is high, deactivation of a catalyst becomes slow. As a result, even if filtration is conducted, catalyst-derived aluminum may remain in the polymerization reaction liquid in the dissolved state.

Figure 2:
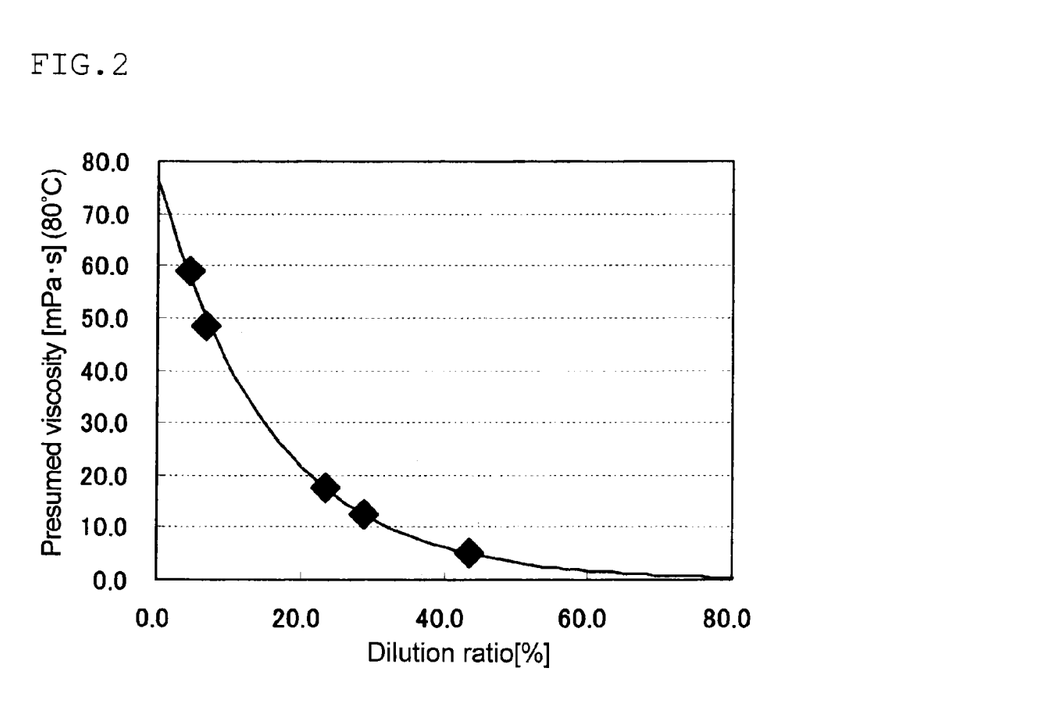
FIG. 2 is a view showing the relationship between the dilution ratio and the liquid viscosity of a polymerization liquid.

FIG. 2 shows a relationship between the added amount of a dilution solvent (dilution ratio) and the liquid viscosity of the polymerization reaction liquid when the polymerization reaction liquid (liquid density at 80° C.: 78 mPa·s) is diluted with 1-decene. In FIG. 2, the dots indicate the actually measured values.

Dilution ratio [%]=[R/(R+F)]×100 [wt./wt.]

F: Amount of polymerization reaction liquid
R: Amount of dilution solvent

As the solvent used for dilution (dilution liquid), an inactive hydrocarbon-based solvent that does not adversely affect a polymer product can be usually used. For example, a cyclic hydrocarbon such as toluene and xylene, an unsaturated hydrocarbon having 6 to 20 carbon atoms such as 1-decene, 1-octene and 1-dodecene, or a dimer thereof can be used.

In addition, the above-mentioned solvent used in the polymerization process can be used.

However, since the polymerization reaction liquid is required to have a sufficiently low viscosity, the liquid viscosity of the dilution solvent is 1 mPa·s or less at 40° C., for example, desirably 0.5 mP·s or less.

Further, separation by distillation is possible in the post process (after deactivation), i.e. a process subsequent to the deactivation. The boiling point of the dilution solvent is preferably 250° C. or less, more preferably 200° C. or less, with 100° C. or less being further preferable. If the boiling point of the dilution solvent is in this range, the dilution solvent can be separated by distillation in the distillation process mentioned later, and can be used again for dilution of the polymerization reaction liquid in the dilution/deactivation process.

As the deactivator, alcohol, water and an aqueous solution of an acid, an alkali and an oxygen-containing compound can be given, for example. Specific examples thereof include an aqueous sodium hydroxide solution, ethanol, isopropyl alcohol, hydrochloric acid and acetone.

Figure 1:
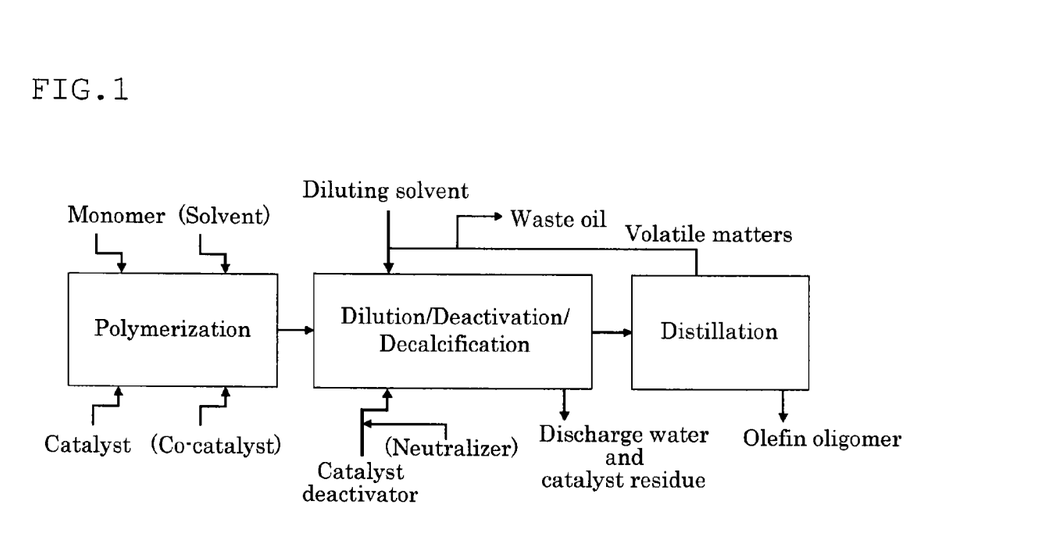
FIG. 1 is a view showing one embodiment of the invention.

After the addition of a deactivator, an olefin polymer can be usually obtained through decalcification and distillation as shown in FIG. 1.

As shown in FIG. 1, it is preferable in respect of cost if light components which have been removed by distillation (an un-reacted monomer, a polymerization solvent, an olefin dimer, or the like) are recycled and used as the dilution solvent at the time of deactivation.

As the metal to be removed by decalcification, aluminum, zirconium, or the like which are contained in a catalyst and a co-catalyst can be given.

A higher metal removal ratio results in a desirable quality as lubricating oil. The metal removal ratio of 95% or more is desirable if the amount of the catalyst used is normal. In order to attain such a metal removal ratio, it is preferred that the polymerization reaction liquid at the time of deactivation have a viscosity of 10 or less mPa·s. When the metal removal ratio of 97% or more is required, it is more desirable to decrease the viscosity to 5 mPa·s or less.

After removing the metal components of the catalyst, the above-mentioned polymerization reaction liquid is distilled to allow the light components off, whereby an olefin oligomer is obtained.

EXAMPLES

Example 1

Preparation of Catalyst

Under nitrogen atmosphere, the following compounds were mixed at the following ratio in a 500 mL-glass Schlenk bottle, whereby catalyst solutions A, B, and N were prepared.

Catalyst solution A: 50 mmol of triisobutyl aluminum relative to 1 L of toluene
Catalyst solution B: 4 mmol of powdery N,N-dimethylanilinium-tetrakis(pentafluorophenyl)borate relative to 1 L of toluene
Catalyst solution N: 1 mmol of (1,1'-dimethylsilylene)(2,2'-dimethylsilylene)bis(cyclopentadienyl)zirconium dichloride relative to 1 L of toluene

[Polymerization Reaction]

A stainless-made autoclave with an internal volume of 100 L was fully dried, followed by drying with nitrogen. Then, 11.94 kg of 1-octene and 17.99 kg of 1-dodecene were placed, and 0.02 MPaG of hydrogen was introduced. Then, 400 mL of the catalyst solution was put and the temperature was elevated to 95° C. and held for 1 hour.

Subsequently, 200 mL of the catalyst solution B and 200 mL of the catalyst solution N were placed in the autoclave, and the temperature was elevated to 105° C. and held.

30 minutes after, 200 mL of the catalyst solution A, 200 mL of the catalyst solution B and 200 mL of the catalyst solution N were incorporated in the autoclave.

30 minutes after (after 1 hour from the start of the reaction), 300 mL of the catalyst solution A, 300 mL of the catalyst solution B and 300 mL of the catalyst solution N were incorporated in the autoclave.

1 hour after (after 2 hours from the start of the reaction), 400 mL of the catalyst solution A, 400 mL of the catalyst solution B and 400 mL of the catalyst solution N were incorporated in the autoclave.

1 hour after (after 3 hours from the start of the reaction), 400 mL of the catalyst solution A, 400 mL of the catalyst solution B and 400 mL of the catalyst solution N were incorporated in the autoclave.

1 hour after (after 4 hours from the start of the reaction), 500 mL of the catalyst solution A, 500 mL of the catalyst solution B and 500 mL of the catalyst solution N were incorporated in the autoclave.

1 hour after (after 5 hours from the start of the reaction), 500 mL of the catalyst solution A, 500 mL of the catalyst solution B and 500 mL of the catalyst solution N were incorporated in the autoclave.

2 hours after (after 7 hours from the start of the reaction), the contents were taken out as the polymerization reaction liquid.

The average temperature during the polymerization reaction was 105° C., the raw material conversion rate of this polymerization liquid was 90% and the liquid viscosity at 40° C. was 91 mPa·s.

The conversion rate and the liquid viscosity were measured by the following method.

(1) Conversion Rate 0.05 g of a sample was dissolved in 5 ml of dichloromethane, and calculated by means of gas chromatography (GC).

(GC Measurement Conditions)

Column: HT-SIMDISTCB (5 m×0.53 mmϕ, film thickness: 0.17 μm)

Column temperature: 40° C. (0.1 min), and elevated at a rate of

20° C./min to 420° C., 420° C. (15 min)

Injection port (COC) temperature: Oven truck

Detector (FID): temperature: 440° C.

Carrier gas: He

Linear velocity: 40 cm/sec

Mode: Constant flow

Injection amount: 0.5 μl (2) Liquid Viscosity

Liquid viscosity was measured by means of a fork oscillating viscometer manufactured by A & D Company, Ltd.

[Dilution, Deactivation and Decalcification]

400 g of the polymerization reaction liquid and 600 g of 1-decene (liquid viscosity at 40° C.: 0.4 mPa·s) were mixed in a 2 L-flask, whereby a diluted polymerization reaction liquid was obtained. The viscosity at 40° C. of the diluted polymerization reaction liquid was 8.4 mPa·s.

This diluted polymerization reaction liquid and a 1% aqueous sodium hydroxide solution were mixed at 80° C. using a heated static mixer at a water/oil (W/O) ratio of 0.1 [vol/vol]. The oil phase viscosity at this time was 4.2 mPa·s at 80° C., stirring intensity was about 20 kW/m³ (linear velocity of passage: about 0.2 m/s), and holding time was about 1 second.

The oil/water mixture liquid was collected in a graduated cylinder in the atmosphere of nitrogen. After the oil and water separation, the oil phase was sampled. By means of a filter having a nominal pore size of 0.2 μm (T020A-, manufactured by ADVANTEC, Co. Ltd.), solid fine particles were removed by filtration.

As a result, the metal component concentration in the filtrate was lowered from 20 wt ppm to less than 1 wt ppm. The metal component concentration was analyzed by the ICP (Inductively Coupled Plasma) spectroscopy method after calcification.

In the meantime, the calcification treatment is to convert the metal components to ashes by burning the sample in order to quantify the metal components.

Comparative Example 1

Preparation of Catalyst

As the catalyst solution, the following catalyst solutions A', B', and N' were prepared under nitrogen atmosphere in the 100 mL-glass Schlenk bottle.

Catalyst solution A': 1 mmol/mL toluene solution of triisobutylaluminum; 45 mL Catalyst solution B': 40 mmol/L toluene solution of N,N-dimethylanillium-tetrakis(pentafluorophenyl)borate; 90 mL Catalyst solution N': 10 mmol/mL toluene solution of (1,1'-dimethylsilylene)(2,2'-dimethylsilylene)-bis(cyclopentadienyl)zirconium dichloride; 90 mL Polymerization Reaction A stainless-made autoclave with an internal volume of 100 L was fully dried, followed by drying with nitrogen. Then, 18.1 kg of 1-octene and 26.7 kg of 1-dodecene, and then 9 mmol of triisobutylaluminium were placed, and 0.01 MPaG of hydrogen was introduced. The temperature was elevated to 90° C.

The above-mentioned catalyst solutions A', B', and N' were allowed to react in the following quantities for 5 hours, while supplying sequentially in the following order. Catalyst incorporation was conducted 4 times in total, and the reaction was conducted for 2 hours after the 4th catalyst incorporation. The contents were taken out as the polymerization reaction liquid. This polymerization reaction liquid had a raw material conversion rate of 90% and had a liquid viscosity at 40° C. of 175 mPa·s.

Start of reaction=1$^{st}$ catalyst incorporation 1 hour after the start of reaction=2$^{nd}$ catalyst incorporation 2 hours after the start of reaction=3$^{rd}$ catalyst incorporation 3 hours after the start of reaction=4$^{th}$ catalyst incorporation 5 hours after the start of reaction=End of reaction The amount of the catalyst in each catalyst incorporation was as follows:

Catalyst solution A': 11.25 mL

Catalyst solution N': 22.5 mL

Catalyst solution B': 22.5 mL

[Deactivation and Decalcification]

The above-prepared polymerization reaction liquid and a 1% aqueous sodium hydroxide solution were mixed at a water/oil (W/O) ratio of 0.5 [vol/vol] at 80° C. in a batch type stirring chamber. The oil phase viscosity at 80° C. was 78 mPa·s.

The stirring intensity at this time was about 0.2 kW/m³ (number of revolutions of stirring: 200 rpm) and stirring was conducted for 10 minutes. Thereafter, the stirring was stopped, and the reaction solution was allowed to stand for 30 minutes. After the oil and water separation, the oil phase was sampled. By means of a filter having a nominal pore size of 0.8 μm (T080A-, manufactured by ADVANTEC, Co. Ltd.), solid fine particles were removed by filtration.

As a result, the metal component concentration in the filtrate was lowered from 28 wt ppm to 10 wt ppm. The metal component concentration was analyzed by the ICP spectroscopy after calcification.

Comparative Example 2

Polymerization Reaction

A polymerization reaction liquid was obtained in the same manner as in [Polymerization reaction] Comparative Example 1.
[Dilution, Deactivation and Decalcification]
300 mL of the above-obtained polymerization reaction liquid, 2 mL of the catalyst solution A', and 200 mL of toluene were sufficiently mixed, and the liquid viscosity at 80° C. was adjusted to 17 mPa·s (liquid viscosity at 40° C.: 40 mPa·s). The polymerization reaction liquid of which the viscosity had been adjusted and an aqueous 1% sodium hydroxide solution were mixed at 80° C. at a water/oil (W/O) ratio of 0.2 [vol/vol] by means of a static mixer. The oil phase viscosity at 80° C. was 17 mPa·s.

Adding the catalyst solution A' to the polymerization reaction liquid was to clarify the effects brought by liquid viscosity by increasing the amount of metal components.

The stirring intensity at this time was about 250 kW/m$^3$ (the linear velocity of passage: about 0.85 m/s) and holding time was about 0.1 second. The water/oil mixture liquid was collected in a graduated cylinder in the atmosphere of nitrogen. After the oil and water separation, the oil phase was sampled. By means of a filter having a nominal pore size of 0.2 μm (T020A-, manufactured by ADVANTEC, Co. Ltd.), solid fine particles were removed by filtration.

As a result, the metal component concentration in the filtrate was lowered from 130 wt ppm to 17 wt ppm. The metal component concentration was analyzed by the ICP spectroscopy.

Comparative Example 3

Polymerization Reaction

A polymerization reaction liquid was obtained in the same manner as in [Polymerization reaction] in Comparative Example 1.
[Dilution, Deactivation and Decalcification]
475 mL of the above-obtained polymerization reaction liquid, 2 mL of the catalyst solution A' and 25 mL of toluene were sufficiently mixed, and the liquid viscosity at 80° C. was adjusted to 60 mPa·s (liquid viscosity at 40° C.: 128 mPa·s). The polymerization reaction liquid of which the viscosity had been adjusted and an aqueous 1% sodium hydroxide solution were mixed at 80° C. at a water/oil (W/O) ratio of 0.2 [vol/vol] by means of a static mixer. The oil phase viscosity at 80° C. was 60 mPa·s.

The stirring intensity at this time was about 20 kW/m$^3$ (the linear velocity of passage: about 0.2 m/s) and holding time was about 1 second. The water/oil mixture liquid was collected in a graduated cylinder in the atmosphere of nitrogen. After the oil and water separation, the oil phase was sampled. By means of a filter having a nominal pore size of 0.8 μm (T080A-, manufactured by ADVANTEC, Co. Ltd.), solid fine particles were removed by filtration.

As a result, the metal component concentration in the filtrate was lowered from 155 wt ppm to 43 wt ppm. The metal component concentration was analyzed by the ICP spectroscopy.

Figure 3:
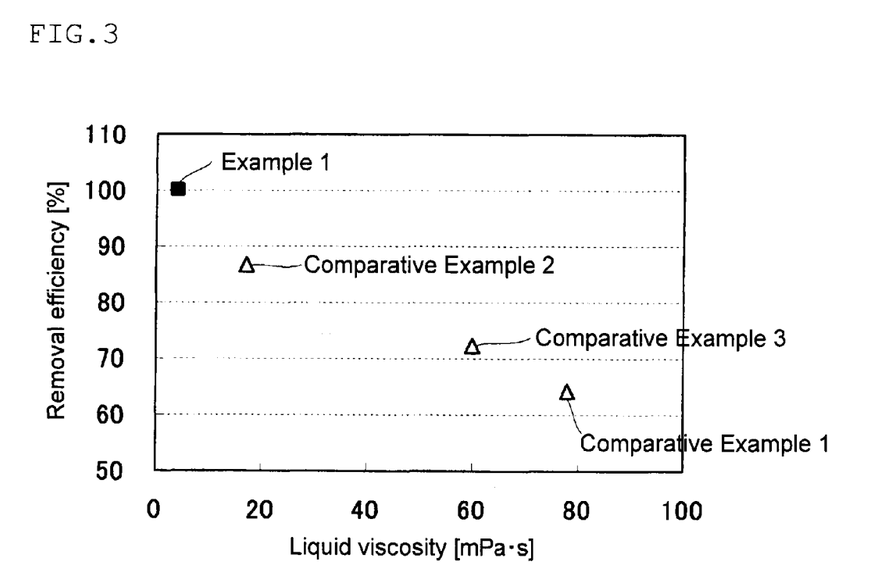
FIG. 3 is a view showing the relationship between the liquid viscosity of the polymerization liquid and the metal removal efficiency in Example 1 and Comparative Examples 1 to 3.

The results of Examples and Comparative Examples (relationship between the liquid viscosity of the polymerization liquid and the metal removal ratio) are shown in FIG. 3. From FIG. 3, it can be understood that the removal ratio of metals derived from the catalyst was significantly lowered with an increase in the liquid viscosity of the polymerization reaction liquid.

INDUSTRIAL APPLICABILITY

The olefin polymer obtained by the production method of the invention can be used as a base material for lubricant.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A method for producing an olefin polymer, the method comprising:
    polymerizing one or more α-olefins each having 6 to 20 carbon atoms in the presence of a metallocene catalyst to obtain an olefin polymer, and
    diluting a polymerization reaction liquid with a solvent before or simultaneously with deactivation of the metallocene catalyst, thereby to lower liquid viscosity of the polymerization reaction liquid to 10 mPa·s or less to promote deactivation and decalcification of the metallocene catalyst.

2. The method according to claim 1,
    wherein the solvent has a boiling point which enables a removal of the solvent by distillation in a post process.

3. The method according to claim 1,
    wherein the solvent is an un-reacted monomer or a polymerization reaction solvent removed in a post process.

* * * * *